(12) United States Patent
Sakurai et al.

(10) Patent No.: US 8,333,899 B2
(45) Date of Patent: Dec. 18, 2012

(54) METHOD OF MANUFACTURING MAGNETIC RECORDING MEDIUM

(75) Inventors: Masatoshi Sakurai, Tokyo (JP); Kaori Kimura, Yokohama (JP); Yousuke Isowaki, Yokohama (JP); Akira Watanabe, Fuchu (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 13/007,395

(22) Filed: Jan. 14, 2011

(65) Prior Publication Data

US 2011/0235212 A1 Sep. 29, 2011

(30) Foreign Application Priority Data

Mar. 29, 2010 (JP) ................................ 2010-076049

(51) Int. Cl.
*B44C 1/22* (2006.01)
(52) U.S. Cl. ............. 216/22; 428/694; 428/611; 360/48
(58) Field of Classification Search ........................ None
See application file for complete search history.

(56) References Cited

U.S. PATENT DOCUMENTS

| | | | |
|---|---|---|---|
| 7,563,381 B2 * | 7/2009 | Baer et al. ........................ | 216/22 |
| 7,587,810 B2 * | 9/2009 | Le ................................ | 29/603.15 |
| 7,993,536 B2 * | 8/2011 | Isowaki et al. .................. | 216/22 |
| 8,070,967 B2 * | 12/2011 | Taniguchi ........................ | 216/22 |
| 2004/0091748 A1 * | 5/2004 | Kamata et al. ............. | 428/694 T |
| 2008/0130354 A1 * | 6/2008 | Ho .................................. | 365/171 |
| 2009/0001047 A1 * | 1/2009 | Pelhos ............................ | 216/22 |

FOREIGN PATENT DOCUMENTS

| | | |
|---|---|---|
| JP | 2005-008882 | 1/2005 |
| JP | 2008-53473 | 3/2008 |
| JP | 2009-252281 | 10/2009 |
| JP | 2009-301655 | 12/2009 |
| JP | 2010-9709 | 1/2010 |
| JP | 2010-009710 | 1/2010 |
| WO | WO 2011/049120 A1 | 4/2011 |

OTHER PUBLICATIONS

Notice of Reasons for Rejection for Japanese Application 2010-076049 mailed Aug. 9, 2011.
Information Sheet for preparing an Information Disclosure Statement Under Rule 1.56.

* cited by examiner

*Primary Examiner* — Binh X Tran
*Assistant Examiner* — David Cathey, Jr.
(74) *Attorney, Agent, or Firm* — Knobbe, Martens Olson & Bear LLP

(57) ABSTRACT

According to one embodiment, a method of manufacturing a magnetic recording medium includes forming on a magnetic recording layer a first hard mask, a second hard mask, a third hard mask and a resist, imprinting the resist with a stamper, removing a residue left in the recesses of the patterned resist, etching the third hard mask by use of the patterned resist as a mask, etching the second hard mask by use of the third hard mask as a mask, etching the first hard mask by use of the second hard mask as a mask, forming a pattern of the magnetic recording layer with ion beam irradiation, and removing the first hard mask by use of a remover liquid with higher reactivity to the metal material of the first hard mask than to a constituent element of the magnetic recording layer.

10 Claims, 6 Drawing Sheets

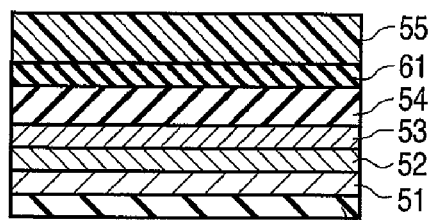
F I G. 7A
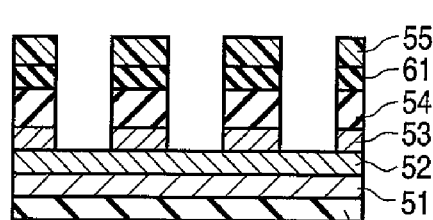
F I G. 7F
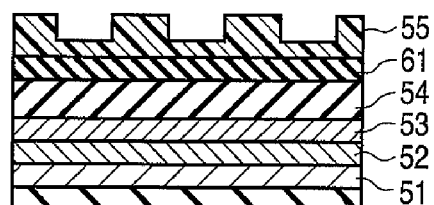
F I G. 7B
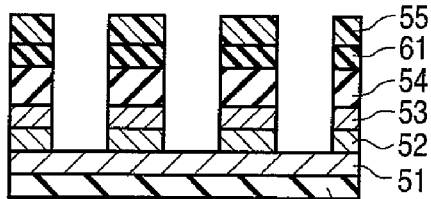
F I G. 7G
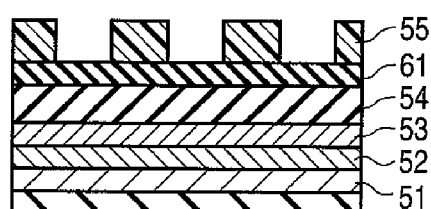
F I G. 7C
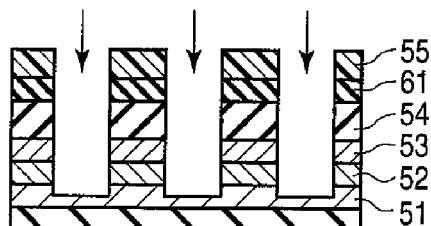
F I G. 7H
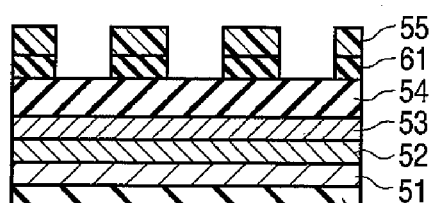
F I G. 7D
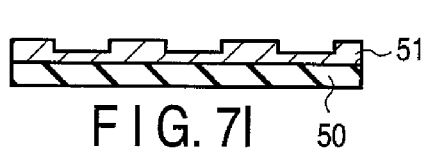
F I G. 7I
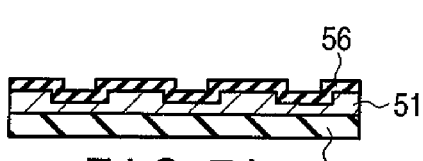
F I G. 7J
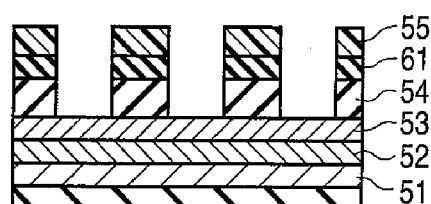
F I G. 7E

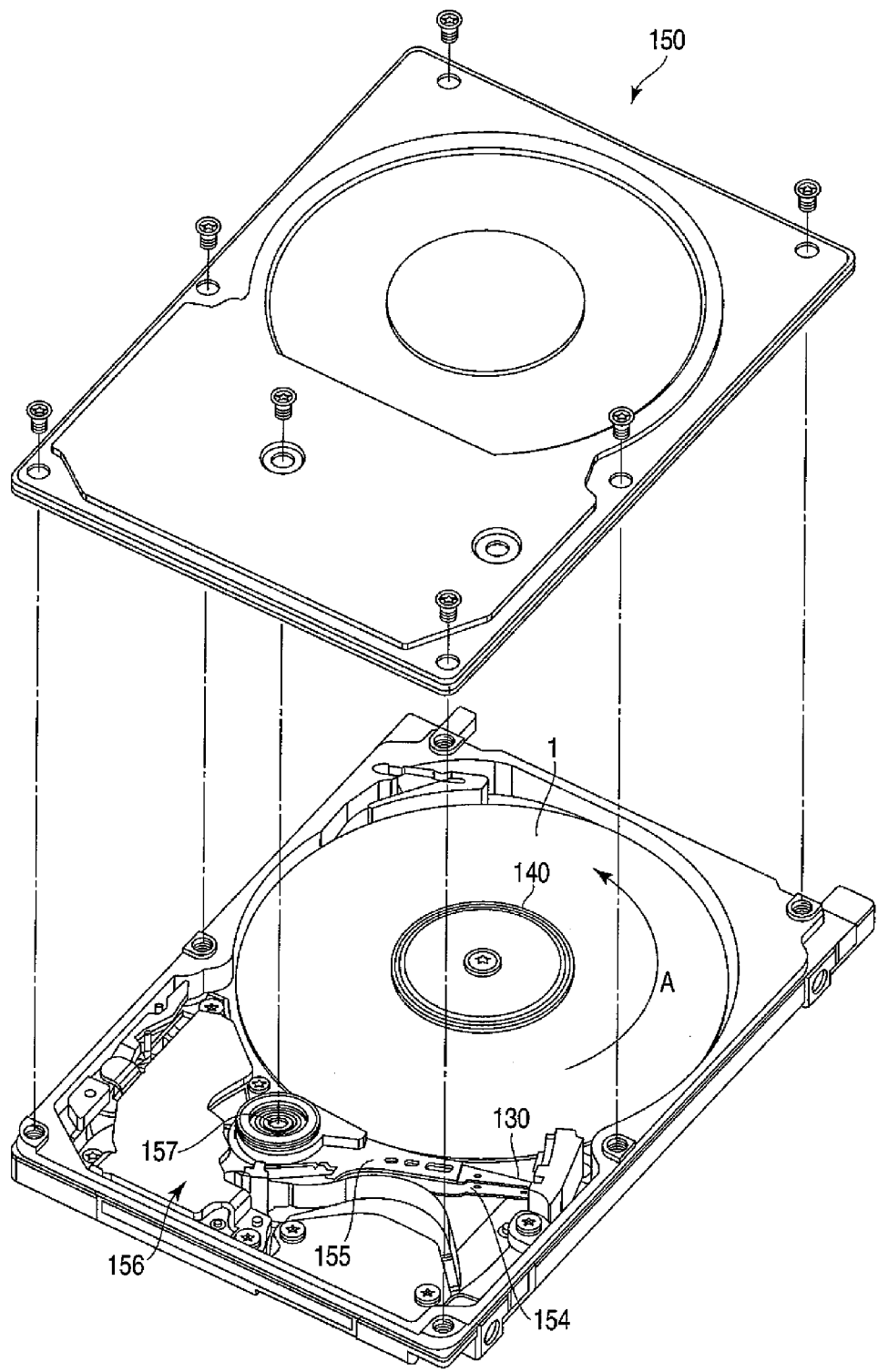
F I G. 8

METHOD OF MANUFACTURING MAGNETIC RECORDING MEDIUM

CROSS-REFERENCE TO RELATED APPLICATIONS

This application is based upon and claims the benefit of priority from Japanese Patent Application No. 2010-076049, filed Mar. 29, 2010; the entire contents of which are incorporated herein by reference.

FIELD

Embodiments described herein relate generally to a method of manufacturing a magnetic recording medium such as a patterned medium.

BACKGROUND

In recent years, recording media such as hard disks have been desired to have an outstandingly increased recording capacity. To respond to the demands, developments of magnetic recording media with high recording capacity are proceeding.

In a magnetic recording medium used in conventional hard disks, a predetermined region of a thin film including polycrystals of magnetic fine particles is used as one bit for recording. In order to increase recording capacity of a magnetic recording medium, the recording density should be increased. In other words, it is necessary to reduce the recording mark size which is usable for recording of one bit. However, when the recording mark size is simply reduced, the influence of noise which depends on the shapes of magnetic fine particles becomes nonnegligible. If the particle size of magnetic fine particles is reduced to lower the noise, a problem of thermal fluctuation occurs, which makes it impossible to maintain recorded data at a room temperature.

In order to avoid these problems, a bit patterned recording medium (BPR) has been proposed, in which the recording material is separated by a nonmagnetic material in advance, and a single magnetic dot is used as a single recording cell to perform read and write.

In magnetic recording media installed in HDDs, there is an arising problem of the interference between adjacent tracks which inhibits improvement in track density. Particularly, reducing a fringe effect of a write head field is a significant technical problem to be solved. To solve this problem, there has been developed a discrete track recording-type patterned medium (DTR medium), in which the magnetic recording layer is processed so that the recording tracks are physically separated from each other. In the DTR medium, it is possible to reduce side erase which erases information in the adjacent tracks in writing and side read which reads information in the adjacent tracks in reading. On this account, the DTR medium is promising as a magnetic recording medium capable of providing a high recording density. Incidentally, it should be noted that the term "patterned medium" as used herein in a broad sense includes the bit patterned recording medium and DTR medium.

In case of manufacturing such a patterned medium, it is significant to form tracks or dots in good shapes. In particular, if roughness is produced along the outlines of tracks or dots (edge roughness), error rates in reading and writing information will be increased. Therefore, such edge roughness should be restricted as far as possible.

In the manufacturing method described in Jpn. Pat. Appln. KOKAI Publication No. 2009-301655, a mask used to form patterns on a magnetic recording layer is removed by dry etching. According to the method, while a fringe property can be improved, there is a possibility that the pattern of the magnetic recording layer is damaged by the dry etching conducted to remove the mask.

On the other hand, in the method described in Jpn. Pat. Appln. KOKAI Publication No. 2008-53473, amorphous MgO or amorphous Mo is used as a mask, and the mask is removed by a wet process using a solution. In such a method, while the damage to the magnetic recording layer due to the removal of the mask can be reduced, there is a possibility that the edge roughness is produced in the patterned magnetic recording layer.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIGS. 7A, 7B, 7C, 7D, 7E, 7F, 7G, 7H, 7I and 7J are sectional views showing an example of the method of manufacturing a magnetic recording medium according to the embodiment; and FIG. 8 is a perspective view of a magnetic recording apparatus in which a magnetic recording medium manufactured by the embodiment is installed.

DETAILED DESCRIPTION

Various embodiments will be described hereinafter with reference to the accompanying drawings. In general, according to one embodiment, there is provided a method of manufacturing a magnetic recording medium, comprising forming, on a magnetic recording layer, a first hard mask comprising a metal material, a second hard mask comprising an oxygen-resistant material, a third hard mask comprising carbon, and a resist, imprinting the resist with a stamper to transfer a pattern of protrusions and recesses to the resist, removing a residue left in the recesses of the patterned resist, etching the third hard mask by use of the patterned resist as a mask to transfer the pattern of protrusions and recesses to the third hard mask, etching the second hard mask by use of the third hard mask as a mask to transfer the pattern of protrusions and recesses to the second hard mask, etching the first hard mask by use of the second hard mask as a mask to transfer the pattern of protrusions and recesses to the first hard mask, forming a pattern of the magnetic recording layer by means of an ion beam irradiation and removing the first hard mask by use of a remover liquid with higher reactivity to the metal material of the first hard mask than to a constituent element of the magnetic recording layer.

Figure 1:
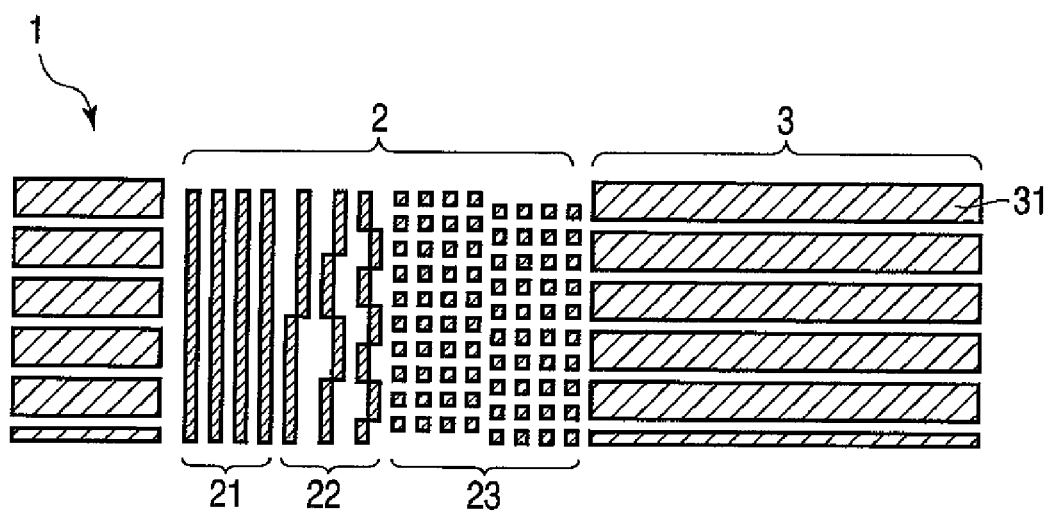
FIG. 1 is a plan view of a discrete track medium (DTR medium) manufactured by the method of the embodiment along the circumferential direction.

FIG. 1 shows a plan view of a discrete track recording medium (DTR medium) which is an example of the patterned medium manufactured by the method of the embodiment along the circumferential direction. As shown in FIG. 1, servo regions 2 and data regions 3 are alternately formed along the circumferential direction of a patterned medium 1. The servo region 2 includes a preamble section 21, an address section 22 and a burst section 23. The data region 3 includes discrete tracks 31 wherein adjacent tracks are separated from each other.

Figure 2:
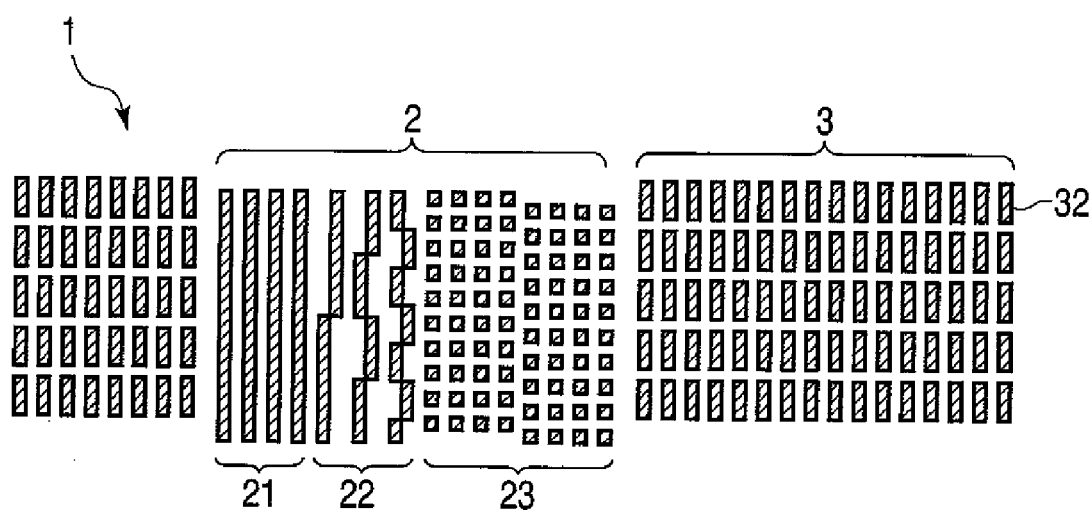
FIG. 2 is a plan view of a bit patterned recording medium manufactured by the method of the embodiment along the circumferential direction.

FIG. 2 shows a plan view of a bit patterned recording medium (BPR medium) which is another example of the patterned medium manufactured by the method of the embodiment along the circumferential direction. In this patterned medium, magnetic dots 32 are formed in the data region 3.

An example of the method of manufacturing a magnetic recording medium according to the embodiment is explained hereinafter with reference to FIGS. 3A, 3B, 3C, 3D, 3E, 3F, 3G, 3H, and 3I.

Figure 3A:
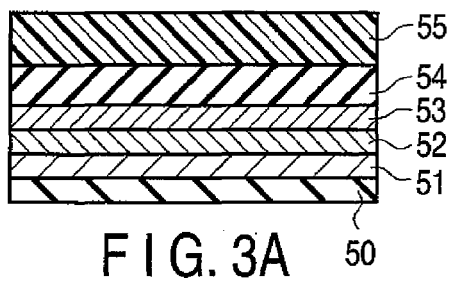
FIGS. 3A, 3B, 3C, 3D, 3E, 3F, 3G, 3H and 3I are sectional views showing an example of the method of manufacturing a magnetic recording medium according to the embodiment.

As shown in FIG. 3A, on a glass substrate 50, deposited are a magnetic recording layer 51, a first hard mask 52, a second hard mask 53, a third hard mask 54 and a resist 55. For example, on the glass substrate 50, deposited are a soft magnetic layer (CoZrNb) with a thickness of 40 nm (not shown), an underlayer for orientation control (Ru) with a thickness of 20 nm (not shown), the magnetic recording layer 51 (CoCrPt—$SiO_2$) with a thickness of 20 nm, the first hard mask 52 made of Mg with a thickness of 5 nm, the second hard mask 53 made of Cu with a thickness of 5 nm and the third hard mask 54 made of carbon with a thickness of 25 nm. On the obtained layers, the resist 55 is spin-coated with a thickness of 50 nm. Then, a stamper on which a predetermined pattern of protrusions and recesses corresponding to the pattern shown in FIG. 1 or 2 are formed is prepared. Stamper is manufactured through the processes of EB lithography, Ni electroforming and injection molding. The stamper is disposed in such a manner that the surface having the protrusions and recesses faces the resist 55.

Figure 3F:
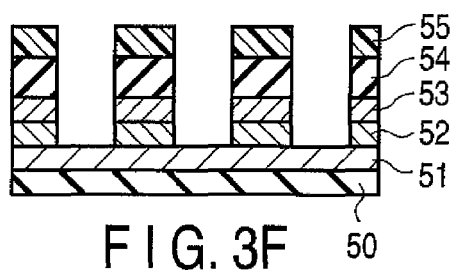
Figure 3B:
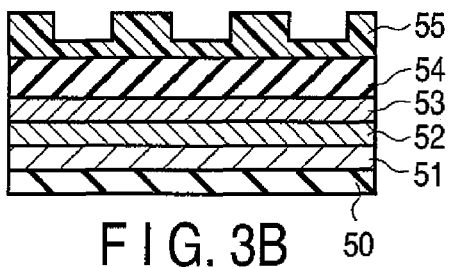

As shown in FIG. 3B, the resist 55 is imprinted with the stamper 60 to transfer the patterns of protrusions and recesses of the stamper 60 to the resist 55. FIG. 3B shows a state wherein the stamper is removed. Resist residues are left in the bottoms of the recesses of the patterns of protrusions and recesses transferred to the resist 55.

Figure 3G:
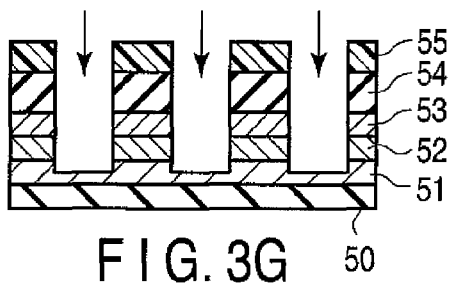
Figure 3C:
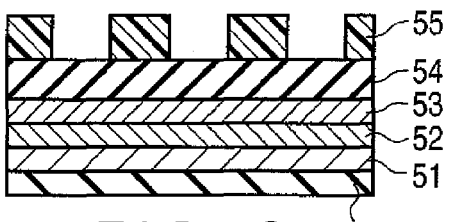

As shown in FIG. 3C, the resist residues in the recesses are removed by dry etching so that the surface of the second hard mask 54 is exposed. This step is performed, for example, by means of an ICP-RIE system, using $CF_4$ as a process gas, with a chamber pressure set to 0.1 Pa, an RF power of a coil and an RF power of a platen set to 100 W and 50 W, respectively, and an etching time set to 15 seconds.

Figure 3H:
Figure 3D:
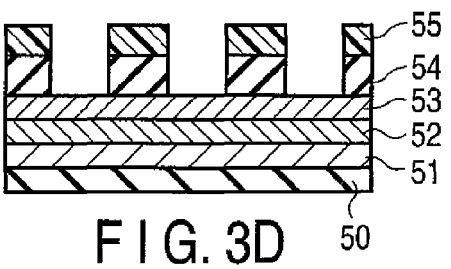

As shown in FIG. 3D, the pattern is transferred to the third hard mask 54 by use of the patterned resist 55 as a mask, by means of ion beam etching so that the second hard mask 53 is exposed at the recesses. This step is performed, for example, by use of an inductively coupled plasma (ICP) RIE system, using $O_2$ as a process gas, with a chamber pressure set to 0.1 Pa, an RF power of a coil and an RF power of a platen set to 100 and 50 W, respectively, and an etching time set to 10 s.

Figure 3I:
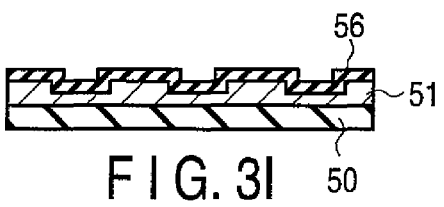
Figure 3E:
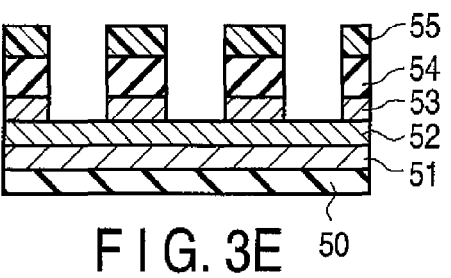

As shown in FIG. 3E, the second hard mask 53 is etched to transfer the pattern thereto by use of the patterned resist 55 and the third hard mask 54 as masks so that the surface of the first hard mask 52 is exposed at the recesses. This step is performed, for example, by use of an ion milling system, using Ar gas, with a gas pressure set to 0.06 Pa, an acceleration voltage set to 400 V and an etching time set to 10 s.

As shown in FIG. 3F, the first hard mask 52 is etched to transfer the pattern thereto by use of the patterned resist 55, the third hard mask 54 and the second hard mask 53 as masks so that the surface of the magnetic recording layer 51 is exposed at the recesses. This step is performed, for example, by use of an ion milling system, using Ar gas, with a gas pressure set to 0.06 Pa, an acceleration voltage set to 400 V and an etching time set to 10 s.

As shown in FIG. 3G, a patterning is performed to the magnetic recording layer 51 by using the patterned resist 55, the third hard mask 54, the second hard mask 53 and the first hard mask 52 as masks. As shown in FIG. 3G, the magnetic recording layer 51 is etched at the recesses of the pattern in such a manner that, in each recess of the pattern, the layer 51 remains partially from the bottom without being etched, and this remaining parts are subjected to demagnetization. In this case, the demagnetization can be performed by changing the crystal structure of the magnetic recording layer 51 to amorphous phase by use of a deactivating gas. This step is performed, for example, by use of an electron cyclotron resonance (ECR) ion gun, using a mixed gas of He—$N_2$ at a flow-ratio of 1:1, with a gas pressure of 0.02 Pa, a microwave power of 1000 W, an acceleration voltage of 1000 V, and a processing time of 50 s. Alternatively, the step may also be performed by etching throughout the entire thickness of the magnetic recording layer 51 at the recesses of the pattern. In this case, the etching is performed to the depth where the underlayer is exposed so that the magnetic recording layer 51 is entirely removed at the recesses of the pattern. In both cases, a pattern which is composed of protrusions having magnetism and recesses having no magnetism is formed on the magnetic recording layer 51.

As shown in FIG. 3H, the remaining first hard mask 52 is removed together with the upper layers thereon. This step is performed by use of a remover liquid. In this connection, the material for the first hard mask 52 has higher reactivity to the remover liquid compared to constituent elements of the magnetic recording layer 51. In a case where the first hard mask 52 is Mg, the step is performed, for example, by immersing the medium in hot water of 80° C. for one minute. By this process, the remaining first hard mask 52 and all the layers deposited thereon are removed.

As shown in FIG. 3I, a protective film 56 is formed by CVP (chemical vapor deposition), and a lubricant is applied thereto to provide a patterned medium of the embodiment.

In the next place, a comparison between conventional methods and method of the embodiment is explained.

In conventional methods, C and Si are respectively used as a first hard mask and a second hard mask, and a resist layer is formed thereon. The pattern of protrusions and recesses on the resist formed by use of a stamper are transferred to the Si layer, to the C layer and to the magnetic recording layer in order, and then the hard masks are peeled in order. During these processes, the second hard mask (Si) is diffused to contaminate the sidewalls of the magnetic recording layer or the first hard mask resulting in a deterioration of the surface property.

It is also possible to remove the masks by a wet process as described in Jpn. Pat. Appln. KOKAI Publication No. 2008-53473. In this case, when a material such as Mo is used, the oxidation-reduction potential of the mask material is higher than that of the material included in the magnetic recording layer. As a result, the elements included in the magnetic recording layer react before the mask material reacts, which causes a problem that the property of the recording layer is deteriorated.

Figure 4A:
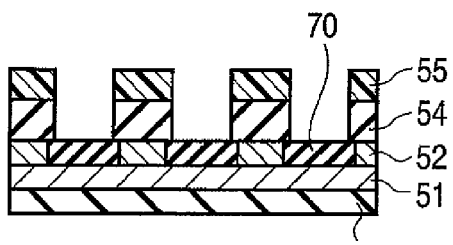
FIGS. 4A, 4B and 4C are sectional and plan views showing the method of manufacturing a magnetic recording medium according to the embodiment.
Figure 4C:
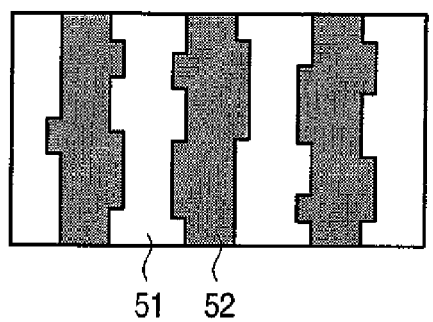
Figure 4B:
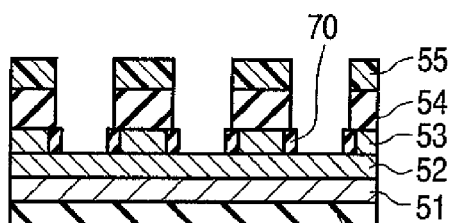

Further, in such a method as disclosed in Jpn. Pat. Appln. KOKAI Publication No. 2008-53473, a carbon hard mask is provided directly on a first hard mask (Mo), and then the carbon hard mask is patterned by using oxygen gas. As a result, as shown in FIG. 4A, by the oxygen gas used in the patterning of the hard mask 54 made of carbon, some parts of the first hard mask 52 are oxidized to form oxidized regions 70. The oxidized regions 70 have an etching rate different from that of regions which are not oxidized in the first hard mask 52. As a result, as shown in FIG. 4B, when the etching of the first hard mask 52 is conducted, oxidized regions 70 will remain insufficiently etched. This causes an edge roughness in the trucks, as shown in FIG. 4C which is a plan view of the magnetic recording medium. The pattern on the magnetic recording layer 51 will be formed reflecting the edge roughness. Incidentally, in FIG. 4C, the resist 55 and the hard mask 54 made of carbon are omitted.

Figure 5A:
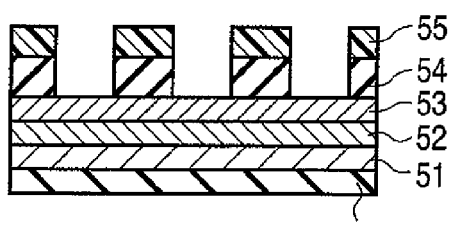
FIGS. 5A, 5B and 5C are sectional and plan views showing the method of manufacturing a magnetic recording medium according to the prior art.
Figure 5C:
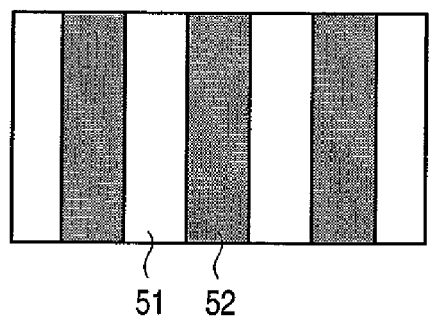
Figure 5B:
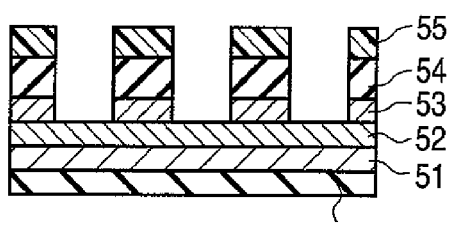

On the other hand, in the method of manufacturing magnetic recording medium according to the embodiment, a specific metal or an alloy thereof is used as the first hard mask, and the first hard mask is removed by a wet process. By use of the wet process in the removal of the mask, abnormal projections or dust which was produced in the formation of the pattern can easily be removed off. In addition, the first hard mask 52 made of a metal or an alloy thereof has higher reactivity to the remover liquid than the magnetic recording layer 51. This allows inhibiting the damage to the magnetic recording layer 51 caused by the remover liquid. Further, in the method of manufacturing magnetic recording medium according to the embodiment, the second hard mask 53 made of a metal which is hard to be oxidized is deposited on the first hard mask 52. This constitution can inhibit the first hard mask 52 from oxidation, volume expansion, crystallization or the like caused by etching by use of oxygen (FIG. 5A). In other words, it becomes possible to conduct a patterning without worsening the edge roughness (FIG. 5B). Consequently, as shown in FIG. 5C which is a plan view of the magnetic recording medium, it is possible to inhibit the edge roughness in tracks. In view of this advantage, the second hard mask 53 may be called "roughness-worsening preventive layer".

In the next place, another example of the method of manufacturing magnetic recording medium of the embodiment is explained.

FIGS. 6A, 6B, 6C, 6D, 6E, 6F, 6G, 6H, 6I, and 6J describe an example of a manufacturing method, wherein a carbon protective layer 60 comprising carbon as a main component is provided between the magnetic recording layer 51 and the first hard mask 52. The carbon protective layer 60 is provided with a thickness of 1 to 20 nm.

Figure 6A:
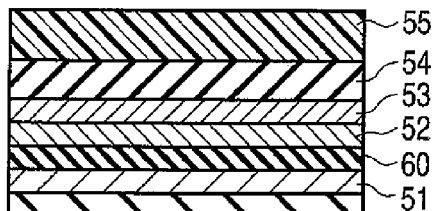
FIGS. 6A, 6B, 6C, 6D, 6E, 6F, 6G, 6H, 6I and 6J are sectional views showing an example of the method of manufacturing a magnetic recording medium according to the embodiment.
Figure 6F:
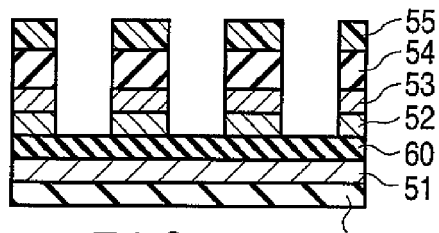
Figure 6B:
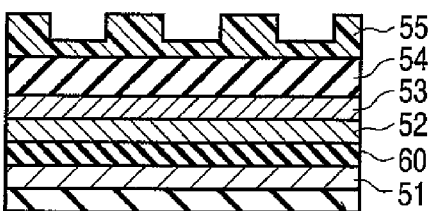

Step of FIG. 6A can be conducted in the same manner as shown in FIG. 3A described above, but the carbon protective layer 60 is provided between the magnetic recording layer 51 and the first hard mask 52 for the purpose of protecting the magnetic recording layer 51 from being etched.

Steps of FIGS. 6B, 6C, 6D, 6E, and 6F can be conducted in the same manner as shown in FIGS. 3B, 3C, 3D, 3E, and 3F described above.

Figure 6G:
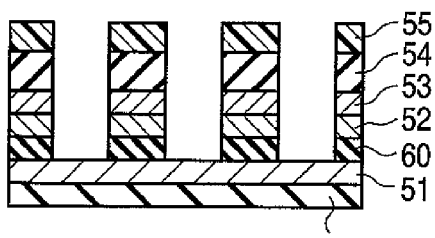
Figure 6C:
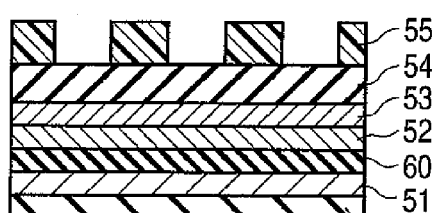

In step of FIG. 6G, patterning of the carbon protective layer 60 is conducted. This step is performed, for example, by use of an inductively coupled plasma (ICP) RIE system, using $O_2$ as a process gas, with a chamber pressure set to 0.1 Pa, an RF power of a coil and an RF power of a platen set to 100 and 50 W, respectively, and an etching time set to 10 to 30 s.

Figure 6H:
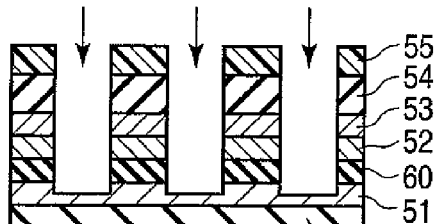
Figure 6D:
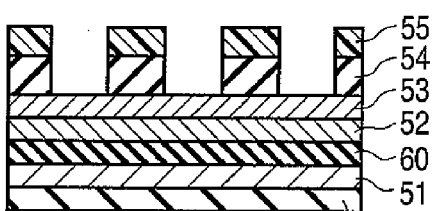

As shown in FIG. 6H, patterning of the magnetic recording layer 51 is conducted. For example, the magnetic recording layer 51 is demagnetized at recesses of the pattern to thereby form a nonmagnetic layer. In this case, by use of a deactivating gas, crystal structure of magnetic recording layer 51 is changed to amorphous phase to thereby perform the demagnetization. This step is conducted, for example, by use of an electron cyclotron resonance (ECR) ion gun, using a mixed gas of He—$N_2$ at a flow-ratio of 1:1, with a gas pressure of 0.02 Pa, a microwave power of 1000 W, an acceleration voltage of 1000 V, and a processing time of 50 s. Alternatively, it is also possible to perform an etching through the entire thickness of the magnetic recording layer 51.

Figure 6I:
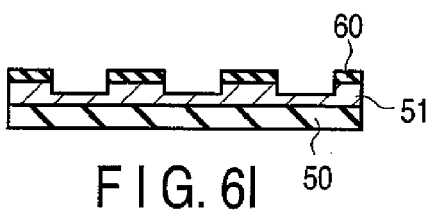
Figure 6E:
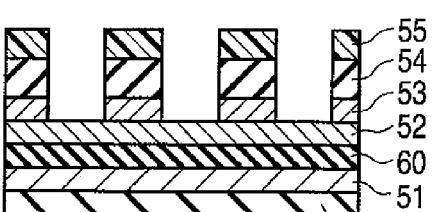

As shown in FIG. 6I, the remaining first hard mask 52 is removed together with the upper layers thereon. This step is performed by use of a remover liquid. In this connection, the material for the first hard mask 52 has higher reactivity to the remover liquid compared to constituent elements of the magnetic recording layer 51. In a case where the first hard mask 52 is Mg, the step is performed, for example, by immersing the medium in hot water of 80° C. for one minute. By this process, the remaining first hard mask 52 and all the layers deposited thereon are removed. In this connection, after the removal of the first hard mask 52, removal of the carbon protective layer 60 can be optionally conducted in view of reduction of magnetic spacing. The removal is conducted, for example, by $O_2$ plasma. The carbon protective layer 60 may be removed off until the layer completely disappears, or alternatively, may be left in a specific thickness. In this case, the thickness of the remaining carbon protective layer 60 is less than 4 nm, for example.

Figure 6J:
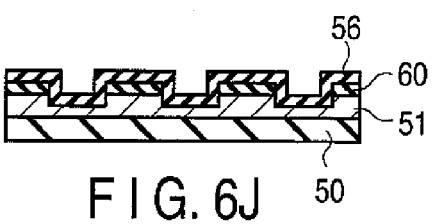

As shown in FIG. 6J, the protective film 56 is formed by means of chemical vapor deposition (CVD). A lubricant may be further applied thereon.

FIGS. 7A, 7B, 7C, 7D, 7E, 7F, 7G, 7H, 7I, and 7J describe an example of a method, wherein a Si layer 61 comprising Si as a main component is provided between the third hard mask 54 and the resist 55. The Si layer 61 is provided with a thickness of 1 to 10 nm.

Step of FIG. 7A can be conducted in the same manner as shown in FIG. 3A described above, but the Si layer 61 is provided between the third hard mask 54 and the resist 55.

Step of FIG. 7B can be conducted in the same manner as shown in FIG. 3B described above.

As shown in FIG. 7O, the resist residue in the recesses is removed by means of a dry etching so that the surface of the Si layer 61 is exposed. This step is conducted, for example, by use of an inductively coupled plasma (ICP) RIE system, using $CF_4$ as a process gas, with a chamber pressure set to 0.1 Pa, an RF power of a coil and an RF power of a platen set to 100 and 50 W, respectively, and an etching time set to 60 s.

As shown in FIG. 7D, the pattern is transferred to the Si layer 61 by using the patterned resist 55 as a mask, by means of ion beam etching so that the third hard mask 54 is exposed at the recesses. This step is conducted, for example, by use of an inductively coupled plasma (ICP) RIE system, using $CF_4$ as a process gas, with a chamber pressure set to 0.1 Pa, an RF power of a coil and an RF power of a platen set to 100 and 50 W, respectively, and an etching time set to 10 s.

Steps of FIGS. 7E, 7F, 7G, 7H, 7I, and 7J can be conducted in the same manner as shown in FIGS. 3D to 3I described above.

According to the method of manufacturing magnetic recording medium shown in FIGS. 7A, 7B, 7C, 7D, 7E, 7F, 7G, 7H, 7I, and 7J, use of the Si layer 61 improves the etching selectivity, which leads to a higher performance of transferring an imprinted pattern.

Incidentally, in the above processes, the thickness of various types of films and the depth of the recesses can easily be measured using, for example, AFM (atomic force microscope), cross-sectional TEM (transmission electron microscope) or the like. Also, the type of metal mask and its composition ratio can easily be determined by EDX (energy dispersive X-ray spectroscopy) analysis. It is also possible to investigate the type of etching gas used in the ion beam etching and its effect by subjecting the finished medium to XPS (X-ray photoelectron spectroscopy) analysis to analyze the remaining gas within the medium. Edge roughness can be measured by an image analysis which uses AFM or planar scanning electron microscopy (SEM).

Details of the materials used in the embodiments are explained hereinbelow.

<First Hard Mask>

A material which can be used to constitute the first hard mask 52 is such a material that has higher reactivity to the remover liquid than the main component of the magnetic recording layer. For example, a material selected from the group consisting of Mg, Al, Sc, Ti, V, Mn, Y, Zr, Nb, La, Ce, Nd, Sm, Eu, Gd, Hf, Al, Zn, Sn, Pb, Ga, In and alloy thereof may be used. The thickness of the first hard mask 52 is preferably 1 to 15 nm. This is because, too thin film cannot be uniformly formed, and too thick film takes longer time in patterning or removal. Since the first hard mask 52 has a higher reactivity to the remover liquid than the magnetic recording layer 51, it can be removed off without causing denaturation in the magnetic recording layer 51.

The materials specifically listed above as a material to constitute the first hard mask 52, can be classified in the following three groups: (1) group of Mg; (2) group comprised of Mg, Al, Sc, Ti, V, Mn, Y, Zr, Nb, La, Ce, Nd, Sm, Eu, Gd and Hf; and (3) group comprised of Al, Zn, Sn, Pb, Ga and In. When a material of group (1) (Mg) is used as the first hard mask 52, the removal can be conducted by use of hot water, because Mg has a property of dissolving in hot water. When a material of group (2) is used as the first hard mask 52, the removal can be conducted by use of weakly acidic aqueous solution, because the materials of group (2) react easily with oxygen due to its low oxidation-reduction potential. Further, since the oxidation-reduction potential of the materials in group (2) is lower than that of the constituent elements of the magnetic recording layer 51, it is possible to minimize the damage to the magnetic recording layer 51 by selecting a weakly acidic aqueous solution which dissolves the first hard mask 52 but does not dissolve the magnetic recording layer 51. When a material of group (3) is used as the first hard mask 52, the removal can be conducted by use of a weakly alkaline aqueous solution, because the materials in group (3) have high reactivity to alkali. Further, since the main element which constitutes the magnetic recording layer 51 hardly reacts with weak alkali, it is possible to selectively remove only the mask made of an element of (3).

<Remover Liquid>

A liquid which can be used as the remover liquid is such a liquid that can affect the first hard mask 52 to remove the first hard mask 52 from the magnetic recording layer 51 (carbon protective layer 60, in some cases). In particular, the remover liquid has higher reactivity to the first hard mask 52 than to the magnetic recording layer 51.

When the first hard mask 52 comprises a material of group (1) (Mg) described above as a main component, hot water can be used as the remover liquid. The hot water, as used herein, means water heated to 60° C. or higher, 70° C. or higher or 80° C. or higher. Incidentally, since Mg is also classified as a material of group (2), it is also possible to use weakly acidic aqueous solution as the remover liquid as described below.

When the first hard mask 52 comprises a material of group (2) described above as a main component, weakly acidic aqueous solution can be used as the remover liquid. As the weakly acidic aqueous solution, it is preferred to use an aqueous solution of a compound selected from the group consisting of $H_2O_2$, $H_3NSO_3$, $H_3PO_4$, $H_2CO_3$, $H_2SO_3$, $CH_3COOH$ and HCOOH.

When the first hard mask 52 comprises a material of group (3) as a main component, weakly alkaline aqueous solution can be used as the remover liquid. As the weakly alkaline aqueous solution, it is preferred to use an aqueous solution of the compound selected from the group consisting of $NH_3$, $Na_2CO_3$, $K_2CO_3$, $NaHCO_3$, $KHCO_3$, $CH_3COONa$, $CH_3COOK$, $Na_2SO_4$, $K_2SO_4$, $Na_3PO_4$ and $K_3PO_4$.

<Second Hard Mask>

A material which can be used to constitute the second hard mask 53 is such a material that is hard to be oxidized when the surface thereof is exposed to oxygen in the process of etching conducted by use of oxygen gas. For example, a metal such as Cu, Ge, Ag, Ir, Pt, Au or Bi or an alloy thereof is desirably used. Since such metals are resistant to oxidation, production of oxide (crystallization) does not occur in the process. As a result, it is possible to prevent the increase of roughness on the pattern. Film thickness of the second hard mask 53 is preferably 2 to 15 nm. This is because, too thin a film does not shut off the oxygen gas, and too thick a film takes a longer process time.

<Third Hard Mask>

The third hard mask 54 comprises carbon as a main component. Particularly, the proportion of carbon is desirably more than 75% in terms of atom number ratio. If the proportion of carbon is 75% or less, the etching selectivity lowers, and as a result, it tends to be difficult to process a magnetic layer into a good shape. The third hard mask 54 may be deposited by means of sputtering or CVD. The film thickness of the third hard mask 54 is preferably 4 to 50 nm. This is because, too thick film takes longer time in etching when it is peeled off, which will cause a damage to the patterned film side. On the other hand, too thin film cannot function as a hard mask in the etching process.

<Carbon Protective Layer>

The carbon protective layer 60 comprises carbon as a main component. The carbon protective layer 60 is optionally provided between the first hard mask 52 and the magnetic recording layer 51. The thickness of the carbon protective layer 60 may be 1 to 20 nm.

In the production of a magnetic recording medium, a part of or the entire carbon protective film may be left on the protrusions of the magnetic recording layer 51, without completely peeled off, so that the layer left is used as the protective layer for the magnetic recording medium. In such a case of using the carbon protective layer 60 as a protective layer, it is preferable that the carbon protective layer 60 is provided with a thickness of less than 15 nm, for example.

<Si Layer>

The Si layer 61 comprises Si as a main component. The Si layer 61 is optionally provided between the third hard mask 54 and the resist 55. The thickness of the Si layer 61 may be 1 to 10 nm. The Si layer 61 has a lower etching selectivity to oxygen gas compared to that of carbon which constitutes the third hard mask 54. For this reason, by use of the Si layer 61, an Si/C mask can be formed between the Si layer and the third hard mask 54, which will provide a good rectangular shape.

<Substrate>

As the substrate, for example, a glass substrate, an Al-based alloy substrate, a ceramic substrate, a carbon substrate or an Si single crystal substrate having a oxide surface may be used. As the glass substrate, an amorphous glass and a crystallized glass are used. Examples of the amorphous glass may include a general-purpose soda lime glass and an alumino-silicate glass. As the crystallized glass, a lithium-based crystallized glass may be exemplified. Examples of the ceramic substrate may include a sintered material containing, as a major component, a general-purpose aluminum oxide, an aluminum nitride, silicon nitride or the like, and fiber-reinforced materials thereof. As the substrate, it is also possible to use the above-described metal substrates or nonmetal substrates with a NiP layer formed thereon by plating or sputtering. Additionally, the methods of forming a thin film on the substrate are not limited to sputtering, but may include vacuum evaporation or electrolytic plating which can obtain the same effect.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Magnetic Recording Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are degraded, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic recording layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be degraded. The perpendicular squareness of the perpendicular magnetic recording layer is preferably 0.8 or more. If the perpendicular squareness is less than 0.8, the thermal fluctuation resistance tends to be degraded.

<Protective Film>

The protective film is provided for the purpose of preventing corrosion of the perpendicular magnetic recording layer and also preventing the surface of a medium from being damaged when the magnetic head is brought into contact with the medium. Examples of the material of the protective film include those containing C, $SiO_2$ or $ZrO_2$. It is preferable to set the thickness of the protective film from 1 to 10 nm. Since such a thin protective film enables to reduce the spacing between the head and medium, it is suitable for high-density recording. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective film for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Hereinafter, details of each step in the embodiment will be explained.

<Deposition of Mask>

A first hard mask, a second hard mask and a third hard mask are deposited in order on the surface layer of the magnetic recording layer in a general magnetic recording medium.

As the first hard mask, Mg, Al, Sc, Ti, V, Mn, Y, Zr, Nb, La, Ce, Nd, Sm, Eu, Gd, Hf, Al, Zn, Sn, Pb, Ga, In or an alloy thereof is deposited with a thickness of 1 to 15 nm. As the second hard mask, Cu, Ge, Ag, Ir, Pt, Au, Si or an alloy thereof is deposited with a thickness of 2 to 15 nm. As the third hard mask, a material which comprises carbon more than 75% in terms of atom number ratio is deposited with a thickness of 4 to 50 nm.

Optionally, a carbon protective layer is deposited between the first hard mask and the magnetic recording layer with a thickness of 1 to 20 nm. Optionally, a Si layer is deposited between the third hard mask and the resist with a thickness of 1 to 10 nm.

<Imprinting>

A resist is uniformly applied to the surface of a medium by spin-coating, dipping method, ink-jet method, or the like. As the resist, a general photosensitive resin, a thermoplastic resin or a thermosetting resin may be used. The resin may desirably be one which can be etched by RIE using a gas containing oxygen or fluorine.

As the stamper for imprinting, one which is made of a material such as quartz, resin, Si or Ni is used. When a stamper made of quartz or resin is used, it is preferable to use a photosensitive resin (photoresist) which is cured with ultraviolet rays. When the resist is made of a thermosetting resin or a thermoplastic resin, the stamper is preferably made of Si or Ni, in view of the heat or pressure applied thereto in imprinting.

The imprinting is performed, for example, by pressing the resist with a resin stamper on which patterns of recording tracks and servo information are formed with a pressure of 5 t for 60 seconds, and by irradiating the resist with ultraviolet ray for 10 seconds, to thereby transfer the patterns onto the resist. For the pressing, on the lower plate of a die set, laminated in order are: the stamper, the substrate, and the stamper. The resultant layers are sandwiched between the lower plate and the upper plate of the die set. The resist is applied on both sides of the substrate beforehand. The stamper and the substrate are disposed such that the surface of the stamper having the protrusions and recesses faces the resist-coated side of the substrate. The patterns of protrusions and recesses formed by the imprinting have a height of 30 to 50 nm, and resulting residues have a thickness of about 5 to 20 nm. If a fluorine-based releasing agent is applied to the stamper, the stamper can be released from the resist satisfactorily.

<Removal of Residues>

Removal of resist residues left after the imprinting is performed by RIE (reactive ion etching). As the plasma source, ICE (inductively coupled plasma) capable of producing high-density plasma under a low pressure is preferable, but an ECR (electron cyclotron resonance) plasma or general parallel-plate RIE system may be used. When a photosensitive resin is used as the resist, $O_2$ gas, $CF_4$ gas, or a mixture gas of $O_2$ and $CF_4$ is used. When an Si-based material (SOG (Spin-On-Glass), for example) is used as the resist, RIE which uses fluorine-containing gas such as $CF_4$ or $SF_6$ is used. The removal of residues is finished at the point where the second hard mask under the resist is exposed.

<Patterning of Third Hard Mask>

After the steps of imprinting and the removal of the resist residues, the third hard mask is patterned by using the patterned resist as a mask. RIE may be used for the patterning of the third hard mask, and another ion beam etching system may also be used. For the process gas, $O_2$ or $O_3$ is preferably used. The patterning of the third hard mask is finished at the point where the surface of the second hard mask is exposed.

<Patterning of Second Hard Mask>

After the patterning of the third hard mask, the second hard mask is patterned. The patterning of the second hard mask may be conducted by use of RIE which uses a reactive gas or by use of ion beam etching which uses an inert gas. If the etching is conducted by use of a reactive gas, it is preferred to use, for example, $SF_6$, $CF_4$, $Cl_2$, HBr. Alternatively, it is also preferred to use a gas comprising at least one of these gases and an inert gas such as Ar as an assist. If the etching is conducted by use of an inert gas, it is preferred to use a gas such as He, Ne, Ar, Xe or Kr. It is also preferred to use the inert gas which is mixed with a reactive gas such as $N_2$ or $O_2$. The patterning of the second hard mask is finished at the point where the surface of the first hard mask is exposed.

<Patterning of First Hard Mask>

After the patterning of the second hard mask, the first hard mask is patterned. The patterning of the first hard mask may be conducted by use of RIE which uses a reactive gas or by use of ion beam etching which uses an inert gas, as in the patterning of the second hard mask. If the etching is conducted in the same manner as shown in the patterning of the second hard mask, the two steps may be conducted in succession. The patterning of the first hard mask is finished at the point where the surface of the magnetic recording layer is exposed.

<Patterning of Magnetic Recording Layer>

After the patterning of the first hard mask, the magnetic recording layer is patterned. Patterning of the magnetic recording layer, as used herein, refers to magnetically separating the magnetic medium. The patterning of the magnetic recording layer may be carried out by a method which provides protrusions and recesses to thereby physically separate the recording region from the non-recording region by means of etching. Another method for the separation is to inactivate the non-recording region by means of an ion beam irradiation. A combination of the above two methods may also be used. The step of inactivation as used herein refers to weakening the magnetic property of the ferromagnetic recording layer at the recesses, relative to the magnetic property at the protrusions, in a patterned magnetic recording body. Weakening the magnetic property as used herein refers to modifying the magnetic property to soft magnetic, to nonmagnetic or to diamagnetic. These changes in the magnetic property can be observed by measuring the values of Hn, Hs or Hc by a vibrating sample magnetometer (VSM) or a Kerr (magneto-optical Kerr effect) measurement system.

To separate the recording region from the non-recording region by means of etching, it is preferred to use an etching which uses an ion beam of Ar as well as He, Ne, Kr, Xe or the like. To generate the ion beam, an ECR system or a usual high-frequency excitation system may be used. RIE which uses Cl gas, a mixed gas of CO and $NH_3$ or methanol may also be used. When the patterning is performed by etching alone, the magnetic body corresponding to non-recording region is entirely etched.

The step of demagnetization may be conducted by use of a gas or a solution. In the case of using a gas, a reactive gas such as $CF_4$, $SF_6$, $CHF_3$, $O_2$, $N_2$, $H_2$; an inert gas such as He, Ne, Ar, Kr, Xe; or a mixed gas thereof may be used. In a case of using a fluorine-containing gas, a step to remove the reactant product of fluorine and Co contained in the ferromagnetic body layer may be incorporated. In that case, preferable means for the removal is water washing or irradiation with water vapor plasma, $H_2$ plasma, or the like. In a case of using an inert gas such as He, Ne, Ar, Kr or Xe, the gas may be ionized by ECR or the like so as to be used in the irradiation by use of high acceleration energy to thereby destroy crystal structure of the magnetic recording layer to lose the magnetic property thereof. In a case of using $O_2$ or $N_2$, O atom or N atom is incorporated into the crystal structure to form a compound. It is also possible to use a combination of an inert gas such as He or Ar and a reactive gas such as $O_2$ or $N_2$, which is very preferable for the demagnetization, owing to effects of the both kinds of gas. In a case where the gas used is $O_2$ or $N_2$, the third hard mask is simultaneously etched. Therefore in this case, the third hard mask is preferably deposited thicker to prevent the third hard mask from fading out.

In a case where the demagnetization is conducted by use of a solution, in other words, using a wet-etching method, an acid such as hydrofluoric acid, hydrochloric acid, nitric acid, or sulfamic acid is used.

For the purpose of shortening the time for demagnetization steps, it is possible to combine the steps of etching and inactivation. Specifically, after a part of the thickness of the non-magnetic regions is etched, the inactivation may be conducted. Alternatively, it is also possible to conduct the inactivation simultaneously with the etching by use of a mixture of an etching gas and a deactivating gas which is transformed into a plasma state.

<Removal of First Hard Mask>

The first hard mask is removed after the patterning of the magnetic recording layer. Removal of the first hard mask means to expose the surface of the magnetic recording layer (or the carbon protective layer, in some cases) under the first hard mask. The second hard mask, the third hard mask, etc. remaining on the first hard mask are peeled together with the first hard mask. The first hard mask is removed by a wet process which uses water, weak acid, weak alkali or the like as a remover liquid. By using such a removal process, the masks can be removed without causing damage to the magnetic recording layer.

In a case where the first hard mask comprises Mg as a main component, hot water is suitable for the remover liquid. The hot water, as used herein, refers to water heated to 60° C. or higher, 70° C. or higher or 80° C. or higher. Alternatively, in a case where the first hard mask comprises Mg as a main component, it is also possible to use weakly acidic aqueous solution as a remover liquid as described below.

In a case where the first hard mask comprises Mg, Al, Sc, Ti, V, Mn, Y, Zr, Nb, La, Ce, Nd, Sm, Eu, Gd or Hf as a main component, a weakly acidic aqueous solution is suitable for the remover liquid. As the weakly acidic aqueous solution, it is preferred to use an aqueous solution of $H_2O_2$, $H_3NSO_3$, $H_3PO_4$, $H_2CO_3$, $H_2SO_3$, $CH_3COOH$ or HCOOH.

In a case where the first hard mask comprises Al, Zn, Sn, Pb, Ga or In as a main component, a weakly alkaline aqueous solution is suitable for the remover liquid. As the weakly alkaline aqueous solution, it is preferred to use an aqueous solution of $NH_3$, $Na_2CO_3$, $K_2CO_3$, $NaHCO_3$, $KHCO_3$, $CH_3COONa$, $CH_3COOK$, $Na_2SO_4$, $K_2SO_4$, $Na_3PO_4$ or $K_3PO_4$.

After the removal, it is preferable to wash the magnetic recording medium with water or with a solvent not to leave the remover liquid.

<Reduction Process Using Hydrogen>

After the removal of the hard masks, a reduction process using hydrogen may be conducted. The reduction process using hydrogen is conducted to cancel the oxidative damage caused by oxygen. The reduction process using hydrogen may be conducted by a method which irradiates the medium with an ion beam generated by an ECR or an RF power. Alternatively, the process may also be conducted by irradiating the medium by use of an RIE system with hydrogen gas mixed therein. It is not necessary to use hydrogen gas alone, but for example, it may be mixed with very small quantity of an inert gas such as He, Ne, Ar, Xe, for the purpose of cleaning the surface. Regardless of the expression "Reduction process using hydrogen", it is also possible to use a reducing gas such as $NH_3$ and CO instead of hydrogen.

<Step of Filling the Recesses>

After the mask is stripped off, filling of the recesses may be performed using a nonmagnetic material. The filling is performed by depositing a nonmagnetic material by means of bias sputtering or ordinal sputtering. The nonmagnetic material may be selected from inorganic substances, metals, and an oxide or a nitride thereof such as Si, SiC, SiC—C, SiOC, SiON, $Si_3N_4$, Al, AlxOy, Ti, TiOx, Ru, Pd, NiNb, NiNbTi, NiTa, NiSi, Zr, ZrOx, W, Ta, Cr, CrN and CN as a simple substance or mixture thereof. The bias sputtering is a sputter depositing method with the substrate being applied with a bias voltage. In this method, it is easy to deposit a film at the same time as filling the recesses.

In a case where the filling was performed, an etch-back is performed until the carbon protective film on the magnetic recording layer or the magnetic recording layer is exposed. This etch-back process is preferably performed by means of ion milling, but in a case where silicon-based filler such as $SiO_2$ is used, it is also possible to perform the process by means of RIE which uses fluorine-containing gas. Etching using an ECR ion gun may be performed. By mixing $O_2$ into a gas for the etch-back, etch-back can be performed at the same time as flattening the surface.

The filling of the recesses may also be conducted prior to the removal of the first hard mask. If the nonmagnetic material mentioned above is filled to the depth of the recesses prior to the removal of the first hard mask, the etch-back becomes unnecessary. In a case where the removal of the first hard mask becomes difficult due to the nonmagnetic material adhered to the sidewalls, it is preferable that the filling material adhered to the sidewalls is previously removed by a process such as an etching with RIE or a wet process to expose the first hard mask.

<Deposition of Protective Film and Post-Treatment>

The carbon protective film may be deposited to obtain good coverage over the protrusions and recesses preferably by means of CVD, but it may be deposited also by means of sputtering or vacuum deposition. When CVD is used, a DLC film containing a large amount of $sp^3$ bonded carbon is formed. Thickness of 2 nm or less is not preferable because it results in an unsatisfactory coverage. On the other hand, thickness of 10 nm or more is not preferable because it increases magnetic spacing between the read/write head and the medium to lower SNR. A lubricant is applied to the surface of the protective film. As the lubricant, for example, a perfluoropolyether, fluorinated alcohol, fluorinated carboxylic acid or the like may be used.

Now, the magnetic recording apparatus (HDD) will be described below. FIG. 8 is a perspective view of a magnetic recording apparatus in which the magnetic recording medium manufactured according to the embodiment is installed.

As shown in FIG. 8, the magnetic recording apparatus 150 according to the embodiment is of a type using a rotary actuator. The patterned medium 1 is attached to the spindle 140, and is rotated in the direction of arrow A by a motor (not shown) that responds to control signals from a drive controller (not shown). The magnetic recording apparatus 150 may comprise a plurality of patterned media 1.

The head slider 130 configured to read from and write to the patterned medium 1 is attached to the tip of the film-like suspension 154. The head slider 130 has a magnetic head mounted near the tip thereof. When the patterned medium 1 rotates, the air bearing surface (ABS) of the head slider 130 is held at a predetermined height so as to fly over the surface of the magnetic disk 200 under a balance of pressing force of the suspension 154 and the pressure produce on the air bearing surface (ABS) of head slider 130.

The suspension 154 is connected to one end of an actuator arm 155. A voice coil motor 156, a kind of linear motor, is provided on the other end of the actuator arm 155. The voice coil motor 156 is formed of a magnetic circuit including a driving coil (not shown) wound around a bobbin and a permanent magnet and a counter yoke arranged opposite to each other so as to sandwich the coil therebetween. The actuator arm 155 is held by ball bearings (not shown) provided at two vertical positions of the pivot 157. The actuator arm 155 can be rotatably slid by the voice coil motor 156. As a result, the magnetic head can be accessed any position on the patterned medium 1.

EXAMPLES

Example 1

A magnetic recording medium (DTR medium) was manufactured by the process shown in FIGS. 3A, 3B, 3C, 3D, 3E, 3F, 3G, 3H, and 3I and evaluated on its performance.

As shown in FIG. 3A, deposited on the glass substrate 50 were: a soft magnetic layer (CoZrNb) with a thickness of 40 nm (not shown); an underlayer for orientation control (Ru) with a thickness of 20 nm (not shown); and the magnetic recording layer 51 (CoCrPt—$SiO_2$) with a thickness of 20 nm. On the magnetic recording layer 51, deposited were: the first hard mask 52 made of Mg with a thickness of 5 nm; the second hard mask 53 made of Cu with a thickness of 5 nm; and the third hard mask 54 made of carbon with a thickness of 25 nm. On the third hard mask 54, the resist 55 was spin-coated to make a thickness of 50 nm. On the other hand, a stamper on which a predetermined pattern of protrusions and recesses are formed is prepared. The stamper was disposed in a manner that the surface having the protrusions and recesses faces the resist 55.

As shown in FIG. 3B, the resist 55 was imprinted with the stamper so that the pattern of protrusions and recesses on the stamper was transferred to the resist 55. After that, the stamper was removed. Resist residue was left on the bottom of the recesses of the pattern of protrusions and recesses transferred to the resist 55.

As shown in FIG. 3C, the resist residue remaining in the recesses was removed by a dry etching so that the surface of the third hard mask 54 is exposed. This step was conducted by use of an inductively coupled plasma (ICP) RIE system, using $CF_4$ as a process gas, with a chamber pressure set to 0.1 Pa, an RF power of coil and an RF power of a platen set to 100 and 50 W, respectively, and an etching time set to 60 s.

As shown in FIG. 3D, by using the patterned resist 55 as a mask, the pattern was transferred to the third hard mask 54 by means of ion beam etching so that the second hard mask 53 is exposed at the recesses. This step was conducted by use of an inductively coupled plasma (ICP) RIE system, using $O_2$ as a process gas, with a chamber pressure set to 0.1 Pa, an RF power of coil and an RF power of a platen set to 100 and 50 W, respectively, and an etching time set to 10 s.

As shown in FIG. 3E, by using the patterned third hard mask 54 as a mask, the second hard mask 53 made of Cu was etched to transfer the pattern thereto so that the surface of the first hard mask 52 is exposed at the recesses. This step was performed by use of an ion milling system, using Ar gas, with a gas pressure set to 0.06 Pa, an acceleration voltage set to 400 V and an etching time set to 10 s.

As shown in FIG. 3F, by using the patterned third hard mask 53 as a mask, the first hard mask 52 made of Mg was etched to transfer the pattern thereto so that the surface of the magnetic recording layer 51 is exposed at the recesses. This step was performed by use of an ion milling system, using Ar gas, with a gas pressure set to 0.06 Pa, an acceleration voltage set to 400 V and an etching time set to 10 s.

As shown in FIG. 3G, a patterning of magnetic recording layer 51 was performed. Magnetic recording layer 51 was demagnetized at the recesses of the pattern. This step was performed by changing the crystal structure of magnetic recording layer 51 to amorphous phase by use of a deactivating gas. Specifically, it was performed by use of an electron cyclotron resonance (ECR) ion gun, using a mixed gas of He—$N_2$ at a flow-ratio of 1:1, with a gas pressure of 0.02 Pa, a microwave power of 1000 W, an acceleration voltage of 1000 V, and a processing time of 50 s.

As shown in FIG. 3H, the remaining the first hard mask 52 was removed together with the upper layers thereon. This step was performed by immersing the medium in hot water of 80° C. for one minute to thereby remove the remaining the first hard mask 52 and all the layers deposited thereon.

As shown in FIG. 3I, the protective film 56 was formed by means of chemical vapor deposition (CVD), and a lubricant was applied thereon. By the above steps, a DTR medium of the embodiment was obtained.

The obtained medium was subjected to a driving check, which showed an error rate of $10^{-6}$ or less. The result showed that the process of Example 1 lowered the edge roughness, and as a result, error rate was reduced.

Example 2

Magnetic recording media were manufactured by the process shown in FIGS. 6A, 6B, 6C, 6D, 6E, 6F, 6G, 6H, 6I, and 6J. The DTR media were manufactured by almost the same process as shown in Example 1 except that the carbon protective layer 60 was provided between the first hard mask and the magnetic recording layer. Four kinds of media were prepared, each having the carbon protective layer 60 with a thickness of (1) 1, (2) 4, (3) 10 and (4) 20 nm, respectively.

The steps of FIGS. 6A, 6B, 6C, 6D, 6E, and 6F were conducted in the same manner as shown in FIGS. 3A, 3B, 3C, 3D, 3E, and 3F in Example 1.

As shown in FIG. 6G, patterning of the carbon protective layer 60 was performed. This step was performed by use of an inductively coupled plasma (ICP) RIE system, using $O_2$ as a process gas, with a chamber pressure set to 0.1 Pa, an RF power of coil and an RF power of a platen set to 100 and 50 W, respectively, and an etching time set to 10 to 30 s.

As shown in FIG. 6H, patterning of magnetic recording layer 51 was performed. The magnetic recording layer 51 was demagnetized at the recesses of the pattern. Particularly, the demagnetization was performed by changing the crystal structure of the magnetic recording layer 51 to amorphous phase by use of a deactivating gas. Specifically, it was performed by use of an electron cyclotron resonance (ECR) ion gun, using a mixed gas of He—$N_2$ at a flow-ratio of 1:1, with a gas pressure of 0.02 Pa, a microwave power of 1000 W, an acceleration voltage of 1000 V, and a processing time of 50 s.

As shown in FIG. 6I, the remaining first hard mask 52 was removed together with the upper layers thereon. This step was performed by immersing the medium in hot water of 80° C. for one minute to thereby remove the remaining first hard mask 52 and all the layers deposited thereon. After that, in the media of (3) and (4), the carbon protective layer 60 was peeled by use of $O_2$ plasma to reduce the thickness down to less than 4 nm with a view of reducing the magnetic spacing.

As shown in FIG. 6J, the protective film 56 was formed by means of chemical vapor deposition (CVD), and a lubricant was applied thereon to thereby obtain a patterned medium.

Each of the media of (1) to (4) was subjected to a driving check, and all of the media showed an error rate of $10^{-6}$ or less. The result showed that the process of Example 2 lowered the edge roughness, and as a result, the error rate was reduced.

Example 3

Magnetic recording media were manufactured by the process shown in FIGS. 7A, 7B, 7C, 7D, 7E, 7F, 7G, 7H, 7I, and 7J. The DTR media were manufactured by almost the same process as shown in Example 1 except that the Si layer 61 was provided between the resist 55 and the third hard mask 54. Three kinds of media were prepared, each having the Si layer 61 with a thickness of (1) 1, (2) 5 and (3) 10 nm, respectively.

The steps of FIGS. 7A and 7B were conducted in the same manner as shown in FIGS. 3A and 3B in Example 1.

As shown in FIG. 7C, the resist residue in the recesses was removed by means of a dry etching so that the surface of the Si layer 61 was exposed. This step was conducted by use of an inductively coupled plasma (ICP) RIE system, using $CF_4$ as a process gas, with a chamber pressure set to 0.1 Pa, an RF power of coil and an RF power of a platen set to 100 and 50 W, respectively, and an etching time set to 60 s.

As shown in FIG. 7D, by using the patterned resist 55 as a mask, the pattern was transferred to the Si layer 61 by means of ion beam etching so that the third hard mask 54 was exposed at the recesses. This step was conducted, for example by use of an inductively coupled plasma (ICP) RIE system, using $CF_4$ as a process gas, with a chamber pressure set to 0.1 Pa, an RF power of coil and an RF power of a platen set to 100 and 50 W, respectively, and an etching time set to 10 s.

The steps of FIGS. 7E, 7F, 7G, 7H, 7I, and 7J were conducted in the same manner as shown in FIGS. 3D, 3E, 3F, 3G, 3H, and 3I in Example 1. By the above steps, a magnetic recording medium of the Embodiment was obtained.

Each of the media of (1) to (3) was subjected to a driving check, and all of the media showed an error rate of $10^{-6}$ or less. The result showed that the process of Example 3 lowered the edge roughness, and as a result, the error rate was reduced. Furthermore, by providing the Si layer 61 between the resist 55 and the third hard mask 54, the etching selectivity was improved, which led to a higher performance of transferring the imprinted pattern.

Example 4

DTR media were manufactured by the same process as shown in Example 1 except that Cu, Ge, Ag, Ir, Pt, Au or Bi was used as a material of a second hard mask, to prepare seven kinds of media.

Thus manufactured DTR media were incorporated into a drive, for a measurement of error rate, and all of the media showed an error rate of $10^{-6}$ or less. The result showed that the process of Example 4 lowered the edge roughness, and as a result, the error rate was reduced.

Example 5

DTR media were manufactured by the same process as shown in Example 1 except that, as the first hard mask, 5 nm thickness of Al, Sc, Ti, V, Mn, Y, Zr, Nb, La, Ce, Nd, Sm, Eu, Gd or Hf was used in addition to Mg. As the remover liquid, an aqueous solution of $H_2O_2$ was used. The concentration of the solution was controlled to be within pH=3 to 6.

The DTR media which were manufactured by the above-described process were incorporated into a drive, for a measurement of error rate, and all of the media showed an error rate of $10^{-6}$ or less. The result showed that the process of Example 5 lowered the edge roughness, and as a result, the error rate was reduced.

Example 6

DTR media were manufactured by the same process as shown in Example 5 except that, as the liquid for removing the mask, an aqueous solution of $H_3NSO_3$, $H_3PO_4$, $H_2CO_3$, $H_2SO_3$, $CH_3COOH$ or $HCOOH$ was used in addition to the aqueous solution of $H_2O_2$. The concentration of the solution was controlled to be within pH=3 to 6.

The DTR media which were manufactured by the above-described process were incorporated into a drive, for a measurement of error rate, and all of the media showed an error rate of $10^{-6}$ or less. The result showed that the process of Example 6 lowered the edge roughness, and as a result, the error rate was reduced.

Example 7

DTR media were manufactured by the same process as shown in Example 1 except that, as the material of the first hard mask, 5 nm thickness of Al, Zn, Sn, Pb, Ga or In was used instead of Mg. As the remover liquid, an aqueous solution of $NH_3$ was used. The concentration of the solution was controlled to be within pH=8 to 11.

The DTR media manufactured by the above-described process were incorporated into a drive, for a measurement of error rate, and all of the media showed an error rate of $10^{-6}$ or less. The result showed that the process of Example 7 lowered the edge roughness, and as a result, the error rate was reduced.

Example 8

DTR media were manufactured by the same process as shown in Example 7 except that, as the liquid for removing the mask, an aqueous solution of $Na_2CO_3$, $K_2CO_3$, $NaHCO_3$, $KHCO_3$, $CH_3COONa$, $CH_3COOK$, $Na_2SO_4$, $K_2SO_4$, $Na_3PO_4$ or $K_3PO_4$ was used instead of the aqueous solution of $NH_3$. The concentration of the solution was controlled to be within pH=8 to 11.

The DTR media manufactured by the above-described process were incorporated into a drive, for a measurement of error rate, and all of the media showed an error rate of $10^{-6}$ or less. The result showed that the process of Example 8 lowered the edge roughness, and as a result, the error rate was reduced.

Comparative Example 1

A DTR medium was manufactured by the same process as shown in Example 1 except that, without providing a second hard mask, a third hard mask of C was deposited on a first hard mask of Mg. The other processes were performed in the same manner as shown in Example 1.

The DTR medium was incorporated into a drive, for a measurement of error rate, and the medium showed an error rate of $10^{-3}$ or more. The result proved that an effect to be expected in a DTR medium could not be obtained. To investigate the cause thereof, Planar SEM images were measured and compared. As a result, a line edge roughness (LER) shown in Comparative Example 1 was 8 nm or more, while that shown in Example 1 was 3.5 nm. It was considered that Mg was crystallized during the oxygen process, resulting in a change of etching rate and an increase of roughness, in other words, resulting in a worse error rate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a magnetic recording medium, comprising:
    forming, on a magnetic recording layer, a first hard mask made of a material selected from the group consisting of Mg, Al, Sc, Ti, V, Mn, Y, Zr, Nb, La, Ce, Nd, Sm, Eu, Gd, Hf, Zn, Sn, Pb, Ga, In and alloys thereof, a second hard mask made of a material selected from the group consisting of Cu, Ge, Ag, Ir, Pt, Au, Bi and alloys thereof, a third hard mask comprising carbon as a main component, and a resist;
    imprinting the resist with a stamper that transfers a pattern of protrusions and recesses to the resist;
    removing a residue in the recesses of the patterned resist;
    etching the third hard mask by use of the patterned resist as a mask, using $O_2$ or $O_3$ gas, that transfers the pattern of protrusions and recesses to the third hard mask;
    etching the second hard mask by use of the third hard mask as a mask, using a gas selected from the group consisting of $SF_6$, $CF_4$, $Cl_2$ and HBr, a gas obtained by mixing $SF_6$, $CF_4$, $Cl_2$ or HBr with He, Ne, Ar, Xe or Kr, an inert gas selected from the group consisting of He, Ne, Ar, Xe or Kr, or a gas obtained by mixing He, Ne, Ar, Xe or Kr with $N_2$, that transfers the pattern of protrusions and recesses to the second hard mask;
    etching the first hard mask by use of the second hard mask as a mask, using a gas selected from the group consisting of $SF_6$, $CF_4$, $Cl_2$ and HBr, a gas obtained by mixing $SF_6$, $CF_4$, $Cl_2$ or HBr with He, Ne, Ar, Xe or Kr, an inert gas selected from the group consisting of He, Ne, Ar, Xe or Kr, or a gas obtained by mixing He, Ne, Ar, Xe or Kr with $N_2$, that transfers the pattern of protrusions and recesses to the first hard mask;
    patterning the magnetic recording layer with ion beam irradiation; and
    removing the first hard mask with a remover liquid having higher reactivity to the metal material of the first hard mask than to a constituent element of the magnetic recording layer.

2. The method of claim 1, further comprising forming a carbon protective layer comprising carbon as a main component having a thickness of 1 to 20 nm, between the magnetic recording layer and the first hard mask.

3. The method of claim 1, further comprising forming a Si layer comprising Si as a main component with a thickness of 1 to 10 nm, between the third hard mask and the resist.

4. The method of claim 1, wherein the material of the first hard mask is Mg, and the remover liquid is water at a temperature of 60° C. or higher.

5. The method of claim 1, wherein the material of the first hard mask is selected from the group consisting of Mg, Al, Sc, Ti, V, Mn, Y, Zr, Nb, La, Ce, Nd, Sm, Eu, Gd, Hf and alloys thereof, and the remover liquid is an aqueous solution of a compound selected from the group consisting of $H_2O_2$, $H_3NSO_3$, $H_3PO_4$, $H_2CO_3$, $H_2SO_3$, $CH_3COOH$ and $HCOOH$.

6. The method of claim 1, wherein the material of the first hard mask is selected from the group consisting of Al, Zn, Sn, Pb, Ga, In and alloys thereof, and the remover liquid is an aqueous solution of a compound selected from the group consisting of $NH_3$, $Na_2CO_3$, $K_2CO_3$, $NaHCO_3$, $KHCO_3$, $CH_3COONa$, $CH_3COOK$, $Na_2SO_4$, $K_2SO_4$, $Na_3PO_4$ and $K_3PO_4$.

7. The method of claim 1, wherein a content of the carbon in the third hard mask is more than 75% in terms of atom number ratio.

8. The method of claim 1, wherein a thickness of the first hard mask formed on the magnetic recording layer is 1 to 15 mm.

9. The method of claim 1, wherein a thickness of the second hard mask formed on the first hard mask is 2 to 15 mm.

10. The method of claim 1, wherein a thickness of the third hard mask formed on the second hard mask is 4 to 50 mm.

* * * * *